2,870,080

ASPHALT PLASTISOLS AND PROCESS FOR THEIR PREPARATION

John C. Illman, El Cerrito, and Harry J. Sommer, Lafayette, Calif., assignors to Shell Development Company, New York, N. Y., a corporation of Delaware No Drawing. Application November 9, 1953
Serial No. 391,126

12 Claims. (Cl. 208—23)

This invention relates to novel asphalt compositions. More particularly, it is concerned with bituminous plastisols and a method for their preparation.

The term "plastisol" is well known in the plastics and coating arts and has reference to a fluid or pasty mixture or suspension of a coating material in particulate form with a plasticizer which is a poor solvent for the resin or polymer at ordinary temperatures, but which is capable of dissolving the particles at elevated temperatures, forming a gel structure. Plastisols have afforded a convenient and economical means of fabricating molded or coated articles from certain restricted classes of thermoplastic resins such as by spread molding, dip coating, spraying or slush molding. For instance, to make a shaped article, a mold of a desired shape is simply charged with plastisol, heated to cause the plastisol to gel and then cooled, whereupon the plastisol becomes rigid; the article retains the desired shape after removal from the mold.

For certain purposes, e. g., for charging molds or coating cloth it is desirable to employ smooth fluid plastisols which flow rapidly in order to increase the speed and convenience of the fabricating operation as well as to improve the quality of the fabricated article. More highly viscous plastisols which may in fact be paste-like in consistency are often formed but are generally undesirable.

Heretofore the type of resinous material found most suitable for use in plastisol processes includes especially the polyvinyls, such as polyvinyl chloride. The limitation upon the process has been the tendency of most film forming materials when in particulate form of suitable subdivision to gradually dissolve in the suspending plasticizers upon storage.

The application of bituminous compositions has always been complicated by the viscosity of the bitumen. Under certain ordinary conditions of temperature it has been possible to overcome this disadvantage by the employment of aqueous asphalt emulsions and the like, controlling the viscosity of the emulsion by a number of well known means. However, such emulsions cannot be used at freezing temperatures and requires the transport of large amounts of water. Cutbacks utilizing relatively volatile thinners are commonly employed. Fire hazards are involved in their use, as well as inefficient utilization of the thinner, which is lost by eventual volatilization. On the other hand, asphalts sometimes may be applied at elevated temperatures for the purpose of decreasing their viscosity. This has the disadvantage of requiring hot storage or hot transportation or the presence of heating and melting equipment at the point of application, all of such requirements being uneconomical if they can be avoided. Significant limitations on the application of heated asphalts for such purposes as impregnation of roofing felts, are the fire hazard which is always present at such times and skin formation during hot storage. At tropical temperatures handling difficulties arise due to the responsibility of fracturing asphalt from shipping drums for the purpose of charging it into melting pots.

It is an object of the present invention to provide improved methods for the application of asphalt for paving, coating, impregnating, or molding purposes. It is another object of this invention to provide stable bituminous plastisols. It is a specific object of this invention to provide such plastisols which are stable over relatively long storage periods. Other objects will become apparent in the following discussion.

Now in accordance with the present invention it has been found that stable bituminous plastisols may be prepared by suspending solid particles of asphalt having average particle size diameters between about 0.5 micron and about 200 microns in hydrocarbon oils of lubricating oil viscosity, the hydrocarbon oil having an aromatic content between about 15% and about 60% by weight. Moreover, the particulate asphalt should possess superficial coatings which are resistant to solution in the suspending lubricating oil as more particularly discussed hereinafter.

Powdered asphalts have been employed in a number of previous processes, the state of subdivision being largely undetermined. Moreover, in these processes the cutter stocks employed have either been volatile substances, wide range materials which are largely volatile, or aromatic materials which rapidly dissolve the asphalt particles. For some purposes the latter type of composition may be desired, but it is this type of rapid dissolution of the particles at ambient temperatures which the present invention is designed to avoid. Moreover, most of the compositions of the prior art which utilized a preformed mixture of the flux oil or cutter stock together with the powdered asphalt were paste-like in composition and thus presented numerous problems of uniform application. The same problems of proper impregnation of such items as roofing felts would be present with stiff compositions such as paste, as are encountered when utilizing ordinary viscous bitumens.

The present compositions, made in accordance with this invention, have been found to be highly fluid and in fact to have a viscosity relatively close to that of the suspending medium, namely, that of the liquid suspending phase. The advantages of such physical properties will be self evident especially where application to roofing felts or similar articles is contemplated since heating will not be required to obtain fluidity. The same will be true of application of such plastisols for paving purposes under either hot or cold conditions, e. g., tropical or arctic temperatures.

The softening point and penetration characteristics are useful guides toward the selection of bitumens which are suitable. In general, asphalts passing the crushing on paper test will have a 0–5 penetration (ASTM D5–25 77° F., 100-gram load, 5 seconds). With the harder grades of asphalt, it is desirable to modify ASTM D5–25 by employing a temperature of 115° F. and a 200-gram load, instead of the conventional 77° F. and 100-gram load. Under such conditions the operable asphalts generally show a 5–35 penetration. In addition to such penetration characteristics, these asphalts will generally be found to have a 180–240° F. softening point, and it is preferred to employ those with a 180–220° F. softening point. Corresponding coal tar pitches passing said crushing on paper test generally have a 165–240° F. softening point (ASTM D–36–26) and an ASTM D5–25 (77° F., 100 grams, 5 second) penetration of 0–5 and, correspondingly, an ASTM D5–25 115° F., 200-gram, 5-second penetration of 0–40.

An example of a suitable asphalt is that produced by taking a 50/60 penetration standard paving grade asphalt, which may contain as much as 60% of oil, and steam distilling this asphalt under a high vacuum, e. g., about a 28-inch vacuum (2-inch absolute pressure), for a long period of time, sufficient to remove nearly all of the oil.

A satisfactory asphalt of the type employed in our invention has been made in this manner by steam refining the asphalt in a shell still under high vacuum. In a typical case, a 30 to 40% yield of brittle asphalt is produced, based on the paving grade asphalt charged to the still. Different asphalts will require refinement to different softening points to produce asphalts of the desired brittleness; thus, a typical California asphalt steam refined under high vacuum to a softening point of 200° F. was satisfactory. Other asphalts may require refinemen to a higher softening point, while some asphalts are suitable although refined to a much lower softening point.

Suitable asphalts of the type employed according to this invention, can also be prepared by the solvent refining of asphaltic petroleum oil, according to processes widely known and used in petroleum refining. Such solvent refining which involves the extraction of asphalt is advantageous in connection with the practice of this invention for various reasons, included among which is the easy control of the asphaltic oil content of the asphalt. Solvent extraction of asphalt has been widely described in petroleum refining literature. See, for instance, Abraham, "Asphalts and Allied Substances," D. Van Nostrand Co., Inc., New York, 5th ed., pp. 135–139; "Liquid Propane—Use in Dewaxing, Deasphalting and Refining Heavy Oils," R. E. Wilson, P. C. Keith, Jr., and R. E. Haylett, J. Ind. Eng. Chem. 28, 1065 (1936).

Among the solvents employed in the solvent extraction of asphalt are liquid sulfur dioxide; liquid hydrocarbons, such as liquefied ethane, pentane, propane, butane; benzol; toluol; furfural, etc., and mixtures of such solvents as, for example, propane with cresol. In general, liquid propane has been found to be the most satisfactory solvent in connection with the solvent extraction of asphalt. In a typical propane process, propane is liquefied by compression and passed to the bottom of a deasphalting tower where it flows upward countercurrently to descending reduced-asphaltic crude oil. The liquid propane dissolves the non-asphaltic portion of the oil and preferentially precipitates the asphalt. The deasphalted oil is withdrawn overhead and the asphalt is removed from the bottom of the tower. At propane temperatures in the range of 100–150° F., asphalt is only slightly soluble in the propane, whereas the remaining components of the reduced-asphaltic crude oil are largely soluble therein at such temperatures. To extract the asphalt from the reduced crude, the reduced crude is usually mixed with 4 to 6 times its volume of liquid propane at 120–150° F. Pressures employed are those required to maintain the solvent in a liquid state, and range from about 100–350 pounds per square inch absolute.

Oil-dissolving properties of liquid propane for the oil components of the reduced crude decrease as the temperature rises above 100° F., and it is accordingly possible to regulate the physical properties of the precipitated asphalt by varying the severity of the oil-dissolving step. Typical asphalt recoveries by the propane extraction process are set forth in tabular form below.

Asphalts of the type employed according to this invention may also be prepared by airblowing asphaltic and non-asphaltic petroleum residues, with or without the aid of catalysts and oxidizing agents, in accordance with techniques familiar to those skilled in the asphalt refining art. Excellent results are obtainable by steam refining a Midway, California, asphaltic crude to a 150–160 softening point and to about 0–5 penetration and then airblowing such residue at a temperature of 400–500° F. at the rate of 3–5 cubic feet of air per gallon of charging stock per hour for 16 hours. Naturally, well within the knowledge of those skilled in the art, the length of blowing time and other conditions of operation will vary, in accordance with well-established principles, according to charging stock employed and type of apparatus used.

High melting, brittle coal tar pitches, usable in this invention, may be obtained in any of the usual coal tar pitch production methods, such as in horizontal coke ovens, gas-works retorts, blast furnaces, and the like. Among such coal tar pitches successfully employed according to our invention are those having an ASTM D36–26 softening point of 165–240° F. and an ASTM D5–25 penetration of 0–5, and a penetration of 0–40 at 115° F., 5 seconds, with a 200-gram load. An ASTM D402 Method distillation of such pitches usually gives only a trace of distillate.

While the particle size may be varied over a considerable range, the most stable plastisols are obtained when the average particle size is between 0.5 and about 200 microns in diameter. In accordance with the present invention, dissolution of these particles in the suspending oil is greatly retarded by superficial treatment of the particle surfaces. This treatment may take a wide variety of forms and may constitute removal of more soluble fractions of the asphalt from the surfaces thereof or may comprise addition of a superficial coating of asphaltic or nonasphalti material having a greater resistance to the lubricating oil suspending medium than the bituminous particles themselves.

In accordance with the present invention one form of creating the subject lubricating oil-resistant surfaces comprises superficial surface extraction of the particulate asphalt with solvents which remove material high in maltenes. Preferably, the washing or extracting agent is relatively volatile so that it can be conveniently removed for recovery of the extracted material as well as the agent. Solvents particularly preferred comprise the lower aliphatic hydrocarbons, especially those having between about 3 and about 10 carbon atoms per molecule including particularly the pentanes, hexanes, heptanes and octanes and mixtures thereof, such as occur in gasolines, naphthas, etc. The most effective hydrocarbons with respect to convenience of use and effectiveness of extraction of the desired maltene fraction has been found to be normal hydrocarbons having 6–8 carbon atoms per molecule, especially normal heptane.

In utilizing these extraction solvents, it is preferred that the asphalt particles be mixed with 2–10 volumes of the aliphatic hydrocarbon, based on the volume of the asphalt

| Charging Stock | Ratio Solvent to Charge | Treating Temp., °F. | Pressure, p. s. i. a. | Yield, volume Percent Asphalt | Penetration, ASTM D5-25 | Softening Point, ASTM D36-26 |
| --- | --- | --- | --- | --- | --- | --- |
| Kettleman Crude | 5-3 | 138 | 310 | 45 | 3 | 161 |
| Do | 5-3 | 125 | 260 | 35 | 0 | 192 |
| Do | 10-1 | 110 | 220 | 25 | 0 | 210 |
| 50/60 pen. Midway: Crude | 4-1 | 140 | 320 | 58 | 0 | 176 |
| Do | 8-1 | 120 | 250 | 45 | 0 | 197 |
| Do | 10-1 | 100 | 220 | 25 | 0 | 240 |
| E. Texas Crude | 8-1 | 158 | 380 | 26.8 | 5 | 153 |
| Rhodessa (la.) Crude | 7.5-1 | 150 | 350 | 19.8 | 4 | 172 |
| Hvy. Mid-Continent Crude | 8.2-1 | 161 | 400 | 46 | 4 | 178 | particles, at a temperature between about 15° C. and about 75° C. for a time sufficient to lower substantially the maltene content of the surface layers of the asphalt particles. This time will vary from several seconds to several minutes, but preferably will be as short as possible, the extract fluid being rapidly drained from the extracted particles.

Proceeding in the direction of addition of hydrocarbon-resistant coatings (rather than subtraction of hydrocarbon miscible surface materials from the particles), the most promising alternative comprises providing the particles with superficial coatings having a substantially higher proportion of asphaltenes than found in the main body of the asphalt particles. Material high in asphaltene content may be prepared by relatively complete extraction of the same or different asphalt with extract solvents such as those discussed above and the residual undissolved material applied by spraying (or other means of application) to the surfaces of the asphalt so as to provide the particles with a coating of asphaltenes, thus greatly reducing the rate of solution in the lubricating oil fractions in which they are eventually dispersed. Other suitable coating materials may be applied to the surface in place of or in addition to the added asphaltene surfaces or the surfaces from which maltenes have been extracted. Suitable substances comprise resinous polymers, such as polyvinyl chloride, or polyvinyl alcohol, as well as the methacrylates, such as polymers of the methacrylates. Other substances which may be employed include the cellulose coating compounds, such as ethyl cellulose, cellulose acetate, cellulose nitrate, methyl cellulose, or carboxy methyl cellulose. The latter two substances are especialy convenient in that they may be applied in water solution. Thus, a dilute solution of the water-soluble cellulose ethers may be utilized in the form of a spray thus causing the creation of a superficial or thin surface coating on particulate asphalt being passed under the sprays for example on a moving belt or the like. Another desired type of coating material suitable for the superficial coating of the particulate asphalt is a petroleum hydrocarbon insoluble pine wood resin sometimes sold under the trade name "Vinsol" and obtained in the solvent fractionation of rosin. Furthermore, high softening point asphaltites such as gilsonite or grahamite may be employed. Treatment of the particles with such agents as ultra violet light irradiation, or by oxidation with permanganates, chromates, $NO_2$, $O_2$ may be utilized in order to oxidize or harden the surface and to improve the oil resistant character of the surfaces.

The proportion of surface reacted to provide a "superficial surface" of greater resistance to solution in the suspending lubricating oil fraction will of course vary depending upon the specific nature of the lubricating oil and of the temperature and time of storage of the plastisol prior to its application. When the creation of the lubricating oil-resistant surface is by means of subtraction of maltenes from the surface of particles of asphalt, the removal of between about 5 and 30% of the ordinary asphalts useful in this invention will be satisfactory. However, when applying coatings to the asphalt such as resin-type silicones, polyvinyls, or cellulose coating materials, the superficial coating may be in the order of about 0.1 to about 5% by weight of the asphalt particles.

The particulate asphalts or other bituminous substances may be prepared by numerous well known means such as crushing the solidified material in a colloid mill or pulverizer. However, such methods normally produce particles having facets and other surfaces of greater than minimum area. The ideal particle shape is that of a sphere and may be gained directly by spraying or atomizing molten asphalt either into an essentially inert gaseous atmosphere such as air or into a liquid immiscible medium such as water. A number of processes for the preparation of suitable particles are already known in the art although care must be taken to produce particles of a sufficient degree of fineness. Within economic limitations, it is desirable to produce particles of relatively uniform particle size and preferably the average diameter is between 1 and about 50 microns. In order to produce plastisols of minimum viscosity, mixtures of particles of differing average particle sizes may be employed as in accordance with the recent patents to Meyer et al., U. S. 2,600,122.

Other methods of producing particles of minimum surface area comprises heating the crushed or micro pulverized granules superficially either in air or water so as to convert the particles to substantially spherical shape. This superficial heating has an additional advantage in tending to close surface pores and thus to reduce the possibility for the suspending oil to enter and dissolve the particles.

One aspect of the stability of plastisols comprises the rate at which the suspended particles tend to settle. The rate of settling will depend in part upon the viscosity of the suspending oil but also upon the difference between the specific gravity of the particles and of the oil. Maximum plastisol stability in this respect is obtained by selecting asphalts of a specific gravity as close as possible to that of the oil or, more practically, to so treat the particles as to change their specific gravity to more nearly that of the oil. The most economical means of performing this is to impregnate molten asphalt with extremely finely divided bubbles of a relatively inert gas such as air or nitrogen and subsequently solidifying and crushing, or atomizing this impregnated material. The proportion of gas bubbles and their size should be adjusted so as to alter the specific gravity of the asphalt to more nearly that of the suspending oil. Optimum stability both with respect to settling and resistance to solution in suspending oil in storage may be obtained by a combination of steps wherein the asphalt is impregnated with the finely divided gas bubbles forming the particles as discussed hereinbefore and if necessary, superficially heating the same so as to create the desired spheric shape and to close surface pores. The resulting asphalt particles when employed in the form of a plastisol with the suspending oil will exhibit maximum plastisol stability.

In selecting a fluid medium for suspension of the particulate hard asphalt in accordance with this invention, it is the intention to utilize a material which when coalesced with the asphalt will produce a substantially homogeneous bituminous composition exhibiting the properties desired in a normal asphalt paving or coating composition. By this is meant, that the suspending oil should be of such composition that it not only does not exhibit an undue rate of solution upon the asphalt particles, but when subsequently coalesced with the latter, will be substantially compatible therewith without any substantial removal or addition thereto in the form of additional fluxing ingredients. For example, the plastisols contemplated herein do not make use of relatively volatile flux oils such as kerosene or fuel oil wherein a substantial proportion of the oil is eventually volatilized from the composition. Nor is use to be made exclusively of oily aliphatic hydrocarbon oils, since such oils, in spite of being satisfactory with respect to plastisol stability, exhibit poor compatibility with the asphalt after attempting coalescence. Furthermore, the exclusive use of highly aromatic oils such as lubricating oil extracts is not contemplated since the latter, while forming compatible compositions, tend to cause rapid dissolution of the asphalt particles during storage even in the absence of heating. Taking each of these facts into consideration, therefore, the present invention contemplates the use of a hydrocarbon oil of lubricating oil viscosity containing between about 15% and about 60% of aromatic type hydrocarbons as the principal suspending oil. For application under extremely cold, e. g., Arctic, conditions the addition of minor quantities of lighter oils, preferably of aliphatic character may be utilized, but the major proportion of suspending oil should be that defined above. Thus, organosol type of compositions are contemplated wherein compatible or non-compatible relatively volatile diluents are used in addition to the oil of lubricating oil viscosity. Suitable lubricating oil or pale oil fractions which may be employed include bulk distillates having a viscosity of from about 100 SUS at 100° F. to about 300 SUS at 210° F. and may contain aromatics in the order of 30–60% and flash points above 300° F., particularly where paving grade asphalt compositions are contemplated. Preferably these fractions are essentially non-waxy. Where blown type asphalt compositions are desired, the aromatic hydrocarbon content should be still lower, in the order of 15–30% aromatics. Reference to aromatics is given in terms of ultra violet analyses. Suitable lubricating oil fractions, therefore, comprise bulk lubricating oil distillates or fractions thereof, and lubricating oil raffinates obtained from the extraction of lubricating oil fractions with selective solvents for aromatics such as sulfur dioxide phenol, sulfolane, nitrobenzene, furfural, and the like. These raffinates are well known in the art of petroleum refining. Combinations of extracts and raffinates also are suitable. The hydrocarbon lubricating oil may be replaced entirely or in part with synthetic lubricants of similar viscosity, volatility and solubility characteristics, e. g., tetraalkyl silicates, silicones, aliphatic diesters, etc.

In preparing the compositions of the present invention, it is preferred that the suspending oil be employed in proportions from about 25% to about 75% by weight of the total plastisol. The particulate asphalt should be present in amounts between about 75% and 25%, the proportion varying with the presence of any additional desired ingredients such as stabilizers, pigments, fillers, surfactants, suspending agents, and other modifying ingredients not essential to the present invention. Preferably the amount of particulate asphalt is in the order of between about 40% and about 60% based on the total plastisol composition, the preferred proportion of suspending oil being in the conjugate range of from about 60% to 40%.

The subject plastisols prepared as described above by addition of the surface treated asphalt particles to the suspending oil with sufficient agitation to cause the formation of a relatively stable suspension may be applied to the desired site by a number of well known means such as spraying, as in the case of paving applications, or by application of a uniform amount by use of doctor blade technique as in application to roofing felts, fabrics and the like. When utilized for paving purposes, the plastisol may be sprayed on the aggregate either in situ or in a mixing apparatus such as a cement mixer. Alternatively, the plastisol may be heated in order to coalesce the ingredients prior to application to aggregate or other solid base substance. Subsequent to the application of the plastisol, sufficient heat should be applied to the composition to accelerate coalescence of the asphalt particles with the suspending oil to form essentially a homogeneous asphalt composition having the normal properties of asphalts employed for paving, saturation or coating purposes. The degree of heating required will vary quite widely dependent upon the compatibility of the asphalt particles with the oil and upon the quantity of asphalt plastisol to be coalesced. Normally a relatively low degree of heating is required (e. g., at least 30 seconds at at least 200° F.) and it is one of the objects of this invention to so design the plastisol that a minimum degree of heating is necessary to cause coalescence at the same time the latter is prevented during reasonably long storage periods at ambient temperatures. For example, it is desirable to pass a roofing felt impregnated with the asphalt plastisol through an oven or a tunnel having infrared lamps of sufficient intensity to cause the desired coalescence. Where larger structures such as pavements and the like are to be treated, open flame type of heaters may be utilized although they are not always essential.

Table I below summarizes pertinent properties of a pulverized pitch obtained by a mild thermal cracking and vacuum flashing of a topped Los Angeles Basin crude oil, the pitch constituting about 12% of the original crude oil residue. It will be noted that a single passage through a micro pulverizer caused fracturing of the pitch so that at least 82% passed a 200 mesh screen. A second passage through the same pulverizer caused a substantially greater comminuting of the particles. In order to be successful, it is desirable that the asphalts utilized in this process, particularly when crushing techniques are employed, have a ring and ball softening point of at least 200° F. and preferably above about 225° F.

TABLE I

*Properties of ground pitch*

|  | No Grinding | Pulverized, 1 Pass | Pulverized, 2 Passes |
|---|---|---|---|
| Softening Point, °F | 322 |  |  |
| Sieve Analysis, % passing: |  |  |  |
| 60 mesh |  | 99.6 |  |
| 100 mesh |  | 96.3 |  |
| 200 mesh |  | 82 |  |
| 325 mesh |  | 63.8 | 95.3 |

Table II illustrates the properties of paving type asphalt plastisols. In preparation of these compositions, the same particulate asphalt utilized in the above tests was extracted with either isopentane or normal heptane so as to remove approximately 12–25% of the original asphalt. This created a lubricating oil-resistant surface for the particles making them suitable for the preparation of stable plastisol compositions. The suspending oil utilized was a bulk distillate having a viscosity of 60 SUS at 210° F. and an aromatic content of about 51% and derived from a mixture of Mt. Poso and Coalinga

TABLE II

*Properties of paving type asphalt plastisols*

| Properties of Pitch | | | | Properties of Plastisol | | | | Properties of Asphalt | | | |
|---|---|---|---|---|---|---|---|---|---|---|---|
| Percent Thru 325 mesh | Solvent Treatment | | | Composition | | Brookfield Visc., Poises at 77° F. | | Pen. at 77° F. | Softening Point, °F. | Visc., poises [1] $V_p$ | Viscosity Reduction Factor, $V_p/V_o$ |
|  | Solvent | Solvent: Pitch Ratio, cc./g. | Percent Extracted | Percent Pitch | Percent 60/210 Bulk Dist. | Initial, $V_o$ | After 7 days |  |  |  |  |
| 63.8 |  |  |  | 41.7 | 58.3 | 86 | 5,000 | 230 | 101 | 1.25×10⁵ | 1,450 |
| 63.8 | Isopentane at 77° F | 7.5/1 | 12 | 40 | 60 | 95 | 620 | 173 | 106 | 2.3×10⁵ | 2,400 |
| 63.8 | Normal heptane at 115° F | 3/1 | 25 | 40 | 60 | 48 | 77 | 80 | 128 | 12.0×10⁵ | 25,000 |
| 63.8 | ----do---- | 3/1 | 25 | 49 | 51 | 180 | 210 | 22 | 162 | 210×10⁵ | 117,000 |
| 95.3 | ----do---- | 3/1 | 21 | 40 | 60 | 83 | 107 | 104 | 125 | 6.8×10⁶ | 8,200 |

[1] Calculated from penetration at 77° F.

crudes. It will be noted in accordance with the data contained in Table II that in the absence of any surface treatment of the particles the viscosity of the plastisol rose in one week to about 50 times that of the original composition. On the other hand, when the washed particles were employed, the viscosity in one week was relatively unchanged, the best results being obtained with normal heptane. The degree of washing will, of course, vary with the planned duration of storage.

It will be noted that upon coalescence of these plastisols to form a substantially homogeneous asphalt composition, the latter exhibited physical properties typical of good paving grade asphalts.

Table III presents properties of plastisols suitable for the production of blown type asphalts such as those especially desired for use in the preparation of asphalt roofings and the like. It will be noted that the suspending oil in this case constituted mixtures of bulk distillate having a viscosity of 60 SUS at 210° F. and containing 51% aromatics together with a lubricating oil raffinate obtained by extraction of 100 SUS at 210° F. bulk distillate with furfural. It will be seen that in some cases a certain proportion of the heptane extract was incorporated in the suspending oil. The heptane extract was that obtained by prior washing of the particulate asphalt with heptane so as to remove approximately 25% by weight of the original asphalt, thus providing the particles with a surface deficiency in maltenes, e. g., high in asphaltenes and resistant to dissolution in the suspending oil. The properties of the plastisols employing part of the heptane extract indicates that the latter is useful in obtaining asphalt compositions having desired properties. In order to alter the properties of the finally coalesced composition, the proportion of heptane (or other) extract may be varied so as to employ the entire amount of extract or any fraction thereof; alternatively, a greater amount of maltenes may be incorporated in the blending oil than that extracted from the treated particles.

F. and about 300 SUS at 210° F., the composition so prepared comprising 40–60% by weight of suspended asphalt particles and 60–40% by weight of the suspending oil.

2. A process of forming a bituminous plastisol which comprises washing pulverulent bituminous material having an average particle size between about 0.5 micron and about 200 microns with an aliphatic hydrocarbon having from about 3 to about 10 carbon atoms per molecule for a period and at a temperature sufficient to superficially remove maltenes from the surface thereof and subsequently suspending the washed product in a petroleum fraction in the lubricating oil range, said oil having an aromatic hydrocarbon content from about 15% to about 60% and having a viscosity between about 100 SUS at 100° F. and about 300 SUS at 210° F., the composition so prepared comprising 40–60% by weight of suspended asphalt particles and 60–40% by weight of the suspending oil.

3. A process of forming an asphalt plastisol which comprises washing a pulverulent asphalt having an average particle size of 5–75 microns with a lower alkane at a temperature between about 15° C. and about 75° C. for a time sufficient to substantially reduce the maltene content of the surfaces of said asphalt and thereafter suspending the washed powder in a petroleum fraction in the lubricating oil range having an aromatic hydrocarbon content between about 15% and about 60% and a viscosity between about 100 SUS at 100° F. and about 300 SUS at 210° F., said fraction being one which will not dissolve the washed powder at ordinary temperatures, but which will dissolve it at elevated temperatures, the composition so prepared comprising 40–60% by weight of suspended asphalt particles and 60–40% by weight of the suspending oil.

4. A process of forming an asphalt plastisol which comprises washing a purverulent asphalt having an average particle size of 5–75 microns with a lower alkane at a temperature between about 15° C. and about 75° C.

TABLE III

*Properties of blown type plastisols*

| Composition of Plastiosols | | | | Properties of Plastisol | | Properties of Asphalt | | |
|---|---|---|---|---|---|---|---|---|
| Percent Washed Pitch | Percent Heptane Extract | Blending Agent | | Brookfield Visc., at 77° F. Poises | | Pen. at 77° F. | Softening Point, ° F. | Penetration Index |
| | | Material | Percent w. | Initial | After 7 days | | | |
| 50 | | Bulk Dist., 60 SUS at 210° F <br> Motor Raffinate [1] | 20 <br> 30 | 136 | 130 | 14 | 245 | 5.5 |
| 60 | | Bulk Dist., 60 SUS at 210 <br> Motor Raffinate [1] | 16 <br> 24 | 500 | 800 | 5 | 257 | 4.3 |
| 40.8 | 14.2 | Bulk Dist., 60 SUS at 210 <br> Motor Raffinate [1] | 18 <br> 27 | 300 | | 24 | 201 | 4.3 |
| 37.1 | 12.9 | Bulk Dist., 200 SUS at 210 <br> Motor Raffinate [1] | 25 <br> 25 | 330 | | 43 | 165 | 3.1 |
| 39.8 | 12.2 | Bulk Dist., 200 SUS at 210 <br> Motor Raffinate [1] | 24 <br> 24 | 570 | | 27 | 200 | 4.5 |
| 50 | | Low Visc. Index, 750 Distillate | 50 | 106 | 165 | 14 | 220 | 4.3 |
| 45.9 | 14.1 | 380 Distillate, dewaxed | 40 | 195 | | 22 | 233 | 5.8 |

[1] From extraction furfural of 100 SUS at 210° F. Bulk Distillate.
Based on Flash Cracker Pitch, 31 average particle size, washed at 115° F. with 3 cc n-heptane per gram pitch; extract ca 25% w.

We claim as our invention:

1. A process of forming a bituminous plastisol which comprises washing pulverulent bituminous material having an average particle size between about 0.5 micron and about 200 microns with normal heptane for a period and at a temperature sufficient to superficially remove maltenes from the surface thereof and subsequently suspending the washed product in a petroleum fraction in the lubricating oil range, said oil having an aromatic hydrocarbon content from about 15% to about 60% and having a viscosity between about 100 SUS at 100° F. for a time sufficient to substantially reduce the maltene content of the surfaces of said asphalt and thereafter suspending the washed powder in petroleum fraction in the lubricating oil range having an aromatic hydrocarbon content between about 15% and about 60% and a viscosity between about 100 SUS at 100° F. and about 300 SUS at 210° F., said fraction being one which will not dissolve the washed powder at ordinary temperatures, but which will dissolve it at elevated temperatures, said petroleum fraction having added thereto at least a portion of the maltenes removed during the initial washing step, the suspended washed particles constituting 40–60% by weight and the suspending oil phase constituting 60–40% by weight.

5. A process according to claim 4 wherein the lubricating oil contains from about 15% to about 30% aromatic hydrocarbons, whereby a plastisol capable of forming a roofing grade asphalt composition is provided.

6. A process according to claim 4 wherein the lubricating oil contains from about 30% to about 60% aromatic hydrocarbons, whereby a plastisol capable of forming a paving grade asphalt composition is provided.

7. An asphalt plastisol composition comprising 60–40% by weight of a hydrocarbon oil of lubricating oil viscosity having an aromatic hydrocarbon content between about 15% and about 60% by weight, having suspended therein 40–60% by weight of asphaltic particles having an average diameter between about 0.5 micron and about 200 microns, the surfaces of said particles being lubricating oil-resistant, the asphalt beneath the surface of said particles being more readily dissolved in the suspending oil than the surfaces thereof.

8. A process of forming an asphalt plastisol comprising providing pulverulent asphalt with a superficial lubricating oil-resistant oxidized asphalt coating, heating said coated particles for a time sufficient to substantially reduce the surface area of the individual particles and close the surface pores thereof, and suspending the coated and treated particles in a lubricating oil having an aromatic hydrocarbon content between about 15% and about 60% whereby a plastisol is formed.

9. A composition according to claim 7 wherein the asphalt particles have an ASTM penetration at 77° F. of 0–5.

10. A composition according to claim 9 wherein the asphalt particles have a softening point of 180–240° F.

11. A composition according to claim 7 wherein the surfaces of the particles comprise blown asphalt.

12. A composition according to claim 7 wherein the surfaces of the particles have a substantially greater proportion of asphaltenes than the asphalt beneath the surfaces.

References Cited in the file of this patent

UNITED STATES PATENTS

| | | |
|---|---|---|
| 205,750 | Johns | July 9, 1878 |
| 727,506 | Warren | May 5, 1903 |
| 1,077,081 | Kaempf | Oct. 28, 1913 |
| 2,131,205 | Wells et al. | Sept. 27, 1938 |
| 2,200,484 | Batchelder | May 14, 1940 |
| 2,308,245 | Ortynsky | Jan. 12, 1943 |
| 2,366,657 | Sorem | Jan. 2, 1945 |
| 2,399,717 | Arveson | May 7, 1946 |
| 2,572,744 | Mollring | Oct. 23, 1951 |
| 2,661,300 | Romberg et al. | Dec. 1, 1953 |